United States Patent
Li

(10) Patent No.: US 10,556,490 B2
(45) Date of Patent: Feb. 11, 2020

(54) VEHICLE VISOR AND SYSTEM, VEHICLE AND LIGHT BLOCKING AND DISPLAY METHOD

(71) Applicant: BOE TECHNOLOGY GROUP CO., LTD., Beijing (CN)

(72) Inventor: Wenbo Li, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/563,559

(22) PCT Filed: Apr. 5, 2017

(86) PCT No.: PCT/CN2017/079449
§ 371 (c)(1),
(2) Date: Sep. 29, 2017

(87) PCT Pub. No.: WO2017/219728
PCT Pub. Date: Dec. 28, 2017

(65) Prior Publication Data
US 2019/0100082 A1    Apr. 4, 2019

(30) Foreign Application Priority Data

Jun. 23, 2016   (CN) .......................... 2016 1 0465991

(51) Int. Cl.
*B60J 3/00* (2006.01)
*B60J 3/04* (2006.01)
(Continued)

(52) U.S. Cl.
CPC ............... *B60J 3/04* (2013.01); *B60J 3/0208* (2013.01); *G02B 27/01* (2013.01)

(58) Field of Classification Search
CPC .............. G02B 27/017; G02B 27/0172; G02B 2027/0138; G02B 2027/0118;
(Continued)

(56) References Cited

U.S. PATENT DOCUMENTS 7,413,233 B1 *  8/2008  Jung ................... B60R 11/0235
                                                        296/97.7
8,544,933 B1 * 10/2013  Fuller ................... B60J 3/0208
                                                        296/97.6
(Continued)

FOREIGN PATENT DOCUMENTS

CN            1979270 A     6/2007
CN          203331791 U    12/2013
(Continued)

OTHER PUBLICATIONS

2nd Office Action dated May 4, 2018 in CN201610465991.X.
(Continued)

*Primary Examiner* — Kiran B Patel
(74) *Attorney, Agent, or Firm* — Syncoda LLC; Feng Ma

(57) ABSTRACT

A visor is configured for shading eyes of a user from a light from behind the visor. The visor includes a first portion and a second portion, wherein the first portion is configured to display images to the user from behind the visor, and the second portion is configured to be able to adjust a rate of light transmittance according to the light from behind the visor. The present disclosure further provides a visor system, a vehicle containing a visor, and a light blocking and display method.

8 Claims, 5 Drawing Sheets

(51) Int. Cl.
*B60J 3/02* (2006.01)
*G02B 27/01* (2006.01)

(58) Field of Classification Search
CPC . G02B 2027/014; B60J 3/0208; B60J 3/0204; H01L 2924/00; A42B 3/221
See application file for complete search history.

(56) References Cited

U.S. PATENT DOCUMENTS

| | | | | |
|---|---|---|---|---|
| 8,789,870 | B1* | 7/2014 | Tolbert | B60J 3/0208 296/97.8 |
| 8,845,002 | B1* | 9/2014 | Desphande | B60J 3/0247 296/97.7 |
| 8,876,185 | B1* | 11/2014 | Edwards, Sr. | B60J 3/0208 296/97.11 |
| 9,108,492 | B2* | 8/2015 | Kim | B60J 3/0243 |
| 9,233,598 | B1* | 1/2016 | Elwood | B60J 3/0217 |
| 9,802,465 | B1* | 10/2017 | Fukushima | B60J 3/0278 |
| 9,942,522 | B2* | 4/2018 | Shaw | H04N 7/181 |
| 10,011,157 | B2* | 7/2018 | Szentkiralyi | B60J 3/0208 |
| 10,399,414 | B2* | 9/2019 | Trinh | B60J 3/0291 |
| 2010/0090494 | A1* | 4/2010 | Marcus | B60J 3/0217 296/97.5 |
| 2011/0109117 | A1* | 5/2011 | Marcus | B60J 3/0208 296/97.5 |
| 2016/0023541 | A1* | 1/2016 | Barna | B60J 3/0208 296/97.2 |
| 2016/0059676 | A1* | 3/2016 | Richman | B60J 3/0208 296/97.8 |
| 2016/0082888 | A1* | 3/2016 | Kothari | B60R 1/00 348/148 |
| 2017/0013188 | A1* | 1/2017 | Kothari | B60R 11/0235 |
| 2017/0028823 | A1* | 2/2017 | Huelke | B60J 3/0282 |
| 2017/0313248 | A1* | 11/2017 | Kothari | B60K 35/00 |
| 2018/0198981 | A1* | 7/2018 | Li | H04N 5/44591 |
| 2018/0365400 | A1* | 12/2018 | Lopez-Hinojosa | G06F 21/32 |

FOREIGN PATENT DOCUMENTS

| | | |
|---|---|---|
| CN | 105416014 A | 3/2016 |
| CN | 205220304 U | 5/2016 |

OTHER PUBLICATIONS

International Search Report and Written Opinion in PCT/CN2017/079449 dated Jun. 30, 2017.
1st Office Action dated Nov. 7, 2017 in CN201610465991.X.

* cited by examiner

901

Starting a vehicle visor of a vehicle such that a side of a first portion of the vehicle visor facing to an interior of the vehicle displays images on an outside of the vehicle opposing to the vehicle visor, and that a second portion of the vehicle visor adjusts a rate of light transmission thereof according to an incident light from the outside of the vehicle

VEHICLE VISOR AND SYSTEM, VEHICLE AND LIGHT BLOCKING AND DISPLAY METHOD

CROSS-REFERENCE TO RELATED APPLICATION

The present application claims priority to Chinese Patent Application No. 201610465991.X filed on Jun. 23, 2016, the disclosure of which is hereby incorporated by reference in its entirety.

TECHNICAL FIELD

The present disclosure is related generally to display technologies, and more specifically to a vehicle visor and a system, a vehicle containing a visor as such, and a light blocking and display method.

BACKGROUND

Vehicle visors, or sun visors, are often needed during normal driving of vehicles. When there is a continuous sunlight exposure (or exposure of other incident lights), a driver typically utilizes a vehicle visor to block the sunlight or incident light so as to avoid the situation where the eyes cannot open comfortably due to too much sunlight or too strong incident light.

However, the vehicle visor can also block the view of the driver, which can bring inconvenience to the driver and can potentially influence the safety of driving.

SUMMARY

In order to address the issues associated with current vehicle visor, the present disclosure provides a vehicle visor and a system, a vehicle containing a visor as such, and a light blocking and display method.

In a first aspect, the present disclosure provides a visor for shading eyes of a driver from a light from behind the visor.

The visor comprises an upper portion and a lower portion. The upper portion is configured to display images to the driver from behind the visor; and the lower portion is configured to be able to adjust a rate of light transmittance according to the light from behind the visor.

In the visor, the upper portion can comprise a display panel. The display panel can include a display screen facing to the driver, and the display screen is configured to display the images to the driver from behind the visor.

In some embodiments of the visor, the display panel is non-transparent.

In some other embodiments of the visor, the display panel is transparent, and in these embodiments of the visor, the upper portion further comprises a shading plate, wherein the shading plate is disposed on a side of the display panel opposing to the driver and configured to block the light from behind the visor through the display panel of the upper portion.

In the visor, the display screen can be configured to be able to adjust a brightness according to the light from behind the visor.

According to some embodiments of the present disclosure, the lower portion of the visor includes a first transparent display panel, configured to display images to the driver from behind the visor.

In the embodiments of the visor as described above, the upper portion comprises a second transparent display panel and a shading plate. The first transparent display panel and the second transparent display panel together form an integrated transparent display panel, which is configured to integrally display the images from behind the visor. The shading plate is disposed on a side of the integrated transparent display panel opposite to the driver.

Herein, the shading plate can be configured to be able to adjust a length along a direction of expansion according to the light from behind the visor.

According to some embodiments of the present disclosure, the upper portion and the lower portion of the visor are integrated, yet according to some other embodiments of the present disclosure, the upper portion and the lower portion of the visor are separated.

In the visor, the lower portion can be expandable or foldable.

In some embodiments of the visor wherein the lower portion is expandable, the lower portion can be configured to be able to adjust a length along a direction of expansion according to the light from behind the visor.

In a second aspect, the present disclosure further provides a visor system. The visor system includes a visor according to any of the embodiments as described above.

According to some embodiments of the present disclosure, the visor system further comprises an image acquisition circuit, a photosensing circuit, and a control circuit.

Herein the control circuit is coupled with the image acquisition circuit, the photosensing circuit, and the visor respectively; the image acquisition circuit is configured to capture, and to send to the control circuit, the images from behind the visor; the photosensing circuit is configured to detect, and to send to the control circuit, the light from behind the visor; and the control circuit is configured to process the images to thereby obtain processed images, and to transmit the processed images to the upper portion of the visor for display, and to control the lower portion of the visor to adjust the rate of light transmission according to the light from behind the visor.

In the visor system as described above, the control circuit can be configured to process the images by a denoising process. As such, prior to process the images, the control circuit can be further configured to detect whether preset noise exists in the images at a present interval, and if so, to process the images by the denoising process.

According to some embodiments of the present disclosure, the visor system further comprises a control button, which is configured to receive a command from the driver to thereby trigger the control circuit to process the images and to transmit the processed images to the upper portion of the visor for display.

According to some embodiments of the present disclosure, the visor system further comprises a prompting circuit, which is coupled with the control circuit and is configured to display a prompt upon triggering by the control circuit.

In the visor system as described above, the visor can be disposed in a vehicle; and the control circuit can be further configured to determine an instant speed of the vehicle, and to send a prompt to the prompting circuit for display, if the instant speed is higher than a first preset speed.

The control circuit can be further configured to determine a distance between the vehicle and an obstacle based on the images captured by the image acquisition circuit, and to send a prompt to the prompting circuit for display if the distance is smaller than a preset threshold and the instant speed is higher than a second preset speed.

According to some embodiments of the present disclosure, the visor system further comprises a solar cell device, which is configured to provide a power supply to the visor system.

In a third aspect, the present disclosure further provides a vehicle.

The vehicle comprises a visor system according to any one of the embodiments as described above.

In a fourth aspect, the present disclosure further provides a light blocking and display method.

The method comprises: starting a visor such that an upper portion thereof displays images from behind the visor to a driver, and that a lower portion thereof adjusts a rate of light transmission according to a light from behind the driver.

Other embodiments may become apparent in view of the following descriptions and the attached drawings.

BRIEF DESCRIPTION OF THE DRAWINGS

To more clearly illustrate some of the embodiments, the following is a brief description of the drawings. The drawings in the following descriptions are only illustrative of some embodiment. For those of ordinary skill in the art, other drawings of other embodiments can become apparent based on these drawings.

DETAILED DESCRIPTION

In the following, with reference to the drawings of various embodiments disclosed herein, the technical solutions of the embodiments of the disclosure will be described in a clear and fully understandable way.

It is obvious that the described embodiments are merely a portion but not all of the embodiments of the disclosure. Based on the described embodiments of the disclosure, those ordinarily skilled in the art can obtain other embodiment(s), which come(s) within the scope sought for protection by the disclosure.

In order to address the aforementioned issues associated with current visors used in vehicles, the present disclosure provides a vehicle visor and a system, a vehicle containing a visor as such, and a light blocking and display method.

In a first aspect, a vehicle visor is provided in the present disclosure.

Figure 1:
FIG. 1 is a schematic diagram of a vehicle visor according to some embodiments of the present disclosure.

FIG. 1 illustrates a vehicle visor according to some embodiments of the present disclosure. As shown in FIG. 1, the vehicle visor has a flat body with a substantially rectangular shape, which comprises an upper portion 101 and a lower portion 102.

The upper portion 101 has a front side facing towards the interior side of the vehicle and the driver, and a back side facing towards the exterior side of the vehicle. The front side is configured to display images from outside of the vehicle faced by the back side of the upper portion. The lower portion 102 is configured to be able to adjust a rate of light transmittance according to an incident light from the outside of the vehicle.

Figure 8:
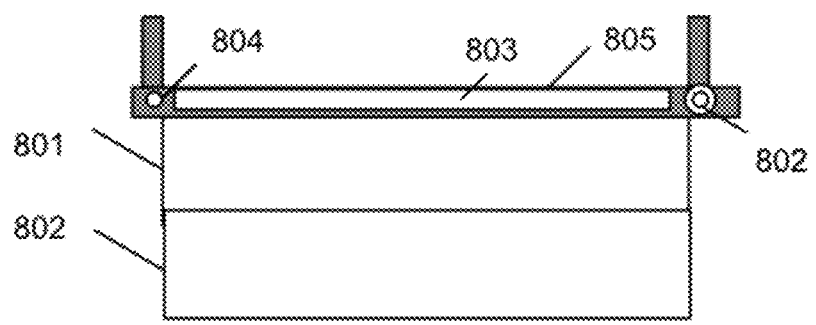
FIG. 8 illustrates a vehicle visor system according to some embodiments of the present disclosure.

Herein by "display images from outside of the vehicle faced by the back side of the upper portion", it is meant that the front side of the upper portion is configured to show a view that would have been seen by a driver in the absence of the visor. In some embodiments, the images displayed in the upper portion may be supplied by a video camera as shown in FIG. 8. Accordingly, the front side of the upper portion 101 facing the interior of the vehicle is referred to as being capable of displaying images, which does not include a situation where a light is transmitted directly through a transparent or colorless glass.

The lower portion 102 can be realized by employing a transparent glass or a similar medium whose light transmittance can be adjusted. As such, a driver of the vehicle can observe the traffic outside of the vehicle comfortably through the lower portion 102 of vehicle visor.

For example, when an incident light is strong, the light transmittance of the lower portion 102 can be adjusted to have a lower rate to thereby avoid the incident light from being too harsh to adversely affect the view of the driver; on the other hand, when the incident light is weak, the light transmittance of the lower portion 102 can be adjusted to have a higher rate to thereby avoid the incident light from being too weak to adversely affect the view of the driver.

By means of the vehicle visor as described above, in addition to meeting the basic requirement for blocking incident lights, the driver is also allowed to see the traffic in front of the vehicle in a real-time manner through the images displayed by the upper portion, and is allowed to further observe actual outside traffic through the lower portion to thereby avoid the danger associated with the delay in displaying the traffic images by the upper portion.

As such, the combination of the upper portion and the lower portion in the vehicle visor as described above takes into consideration both safety and comfort, and can thus result in an improved performance of vehicle visor, leading to an increased safety of driving of the vehicles.

Figure 2:
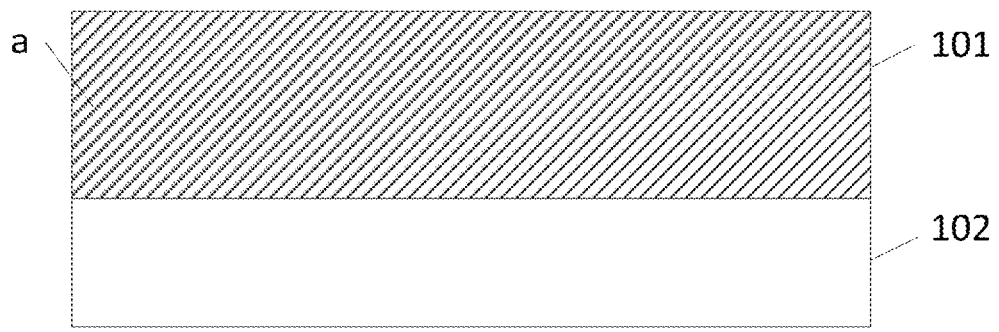
FIG. 2 is a schematic diagram of a vehicle visor according to some other embodiments of the present disclosure.

FIG. 2 illustrates a vehicle visor according to some embodiments of the present disclosure. As shown in FIG. 2, the upper portion 101 of the vehicle visor is comprised of a display device a for display images to the driver.

The display device a is disposed on the front side of the visor facing towards the interior of the vehicle, and is configured to display images outside of the vehicle faced by the back side of the visor. Herein it should be noted that the display device a is referred to as a non-transparent display device which has a function of display and a function of blocking incident lights. Preferably, the display device a can adjust the brightness of the display screen according to the light shedding from outside of the vehicle, so as to improve the comfort of the driver in watching the display screen.

The display device can be a liquid crystal display (LCD), an organic light-emitting diode (OLED) display, an electrochromism device (ECD), a polymer dispersed liquid crystal (PDLC) display, an E-paper display, or of some other types.

According to some embodiments of the present disclosure, the upper portion can be comprised of a non-transparent display panel, which itself can realize a non-transparent display of the images outside of the vehicle, without the need to arrange an additional display device. Such a configuration can simplify the structure of the vehicle visor.

According to some embodiments of the present disclosure, the upper portion can comprise a first transparent display panel and a shading plate. The shading plate is disposed on a side facing to the exterior of the vehicle, and is configured to allow a non-transparent display for the first transparent display panel. Preferably, the shading plate can be a reflecting plate, which can have a reflective surface facing to the driver, so as to increase a display contrast of the upper portion.

According to some embodiments of the present disclosure, the lower portion can comprise a transparent panel. The transparent panel can be configured to adjust the rate of light transmittance to thereby allow the driver to comfortably observe the traffic outside of the vehicle. Herein the transparent panel can have a composition of a glass or a transparent plastic having an adjustable light transmission rate, or can comprise a layer (e.g., a liquid crystal layer) which allows for the light transmission rate to be adjusted.

According to some embodiments of the present disclosure, the lower portion can comprise a second transparent display panel. The second transparent display panel can not only realize a transparent display of images outside of the vehicle facing the back side of the vehicle visor, but can also allow the driver to observe the traffic outside of the vehicle directly through the lower portion. As such, the driver can both watch the images displayed by the lower portion, and observe the actual outside traffic through the lower portion.

According to some embodiments of the present disclosure, the upper portion 101 and the lower portion 102 can be integrated as a single unit 504, and when the vehicle visor is expanded, both the upper portion 101 and the lower portion 102 are in an expanded state.

According to some other embodiments of the present disclosure, the upper portion 101 and the lower portion 102 can be separated, and when the vehicle visor is expanded, the upper portion 101 is expanded accordingly, and the lower portion 102 can be in an expanded state or in an unexpanded state.

Figure 3:
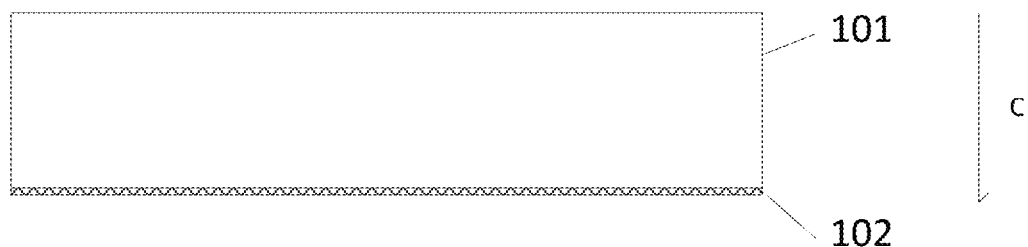
FIG. 3 and FIG. 4 illustrate two scenarios wherein the lower portion 102 is in an unexpanded state according to some embodiments of the present disclosure.
Figure 4:
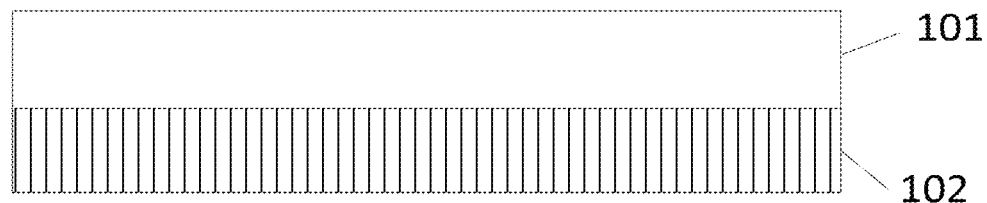

As shown in FIG. 3 and FIG. 4, the unexpanded state of the lower portion 102 can include two scenarios: a retracted state (as illustrated in FIG. 3), or a folded state (as illustrated in FIG. 4). It is noted that FIG. 4 shows the side of the vehicle visor facing the exterior of the vehicle, and as such, when the lower portion 102 is folded, it folds towards a back side of the vehicle visor (i.e. the side facing to the exterior of the vehicle) so as not to block the display by the upper portion 101.

According to some embodiments of the present disclosure, the lower portion 102 can adjust a length along a direction of expansion of the vehicle visor according to the incident light outside the vehicle. As shown in FIG. 3, the direction of expansion of the vehicle visor is illustrated as C, and the lower portion 102 can adjust a length along the direction of C.

For example, if an incident light from outside of the vehicle is too strong, the lower portion 102 can have an increased length along the direction of expansion of the vehicle visor, so as to block the incident light as much as possible. It should be noted that although the lower portion is configured as a transparent portion, it is also configured to be able to adjust a rate of light transmission. As such, the lower portion can not only allow the driver to observe the traffic outside the vehicle therethrough, but can also block part of the incident light by decreasing the rate of light transmission thereof.

Figure 5:
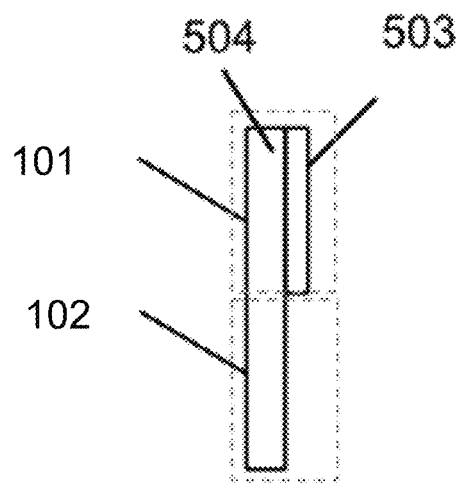
FIG. 5 shows a cross-section view illustrating a vehicle visor according to some embodiments of the present disclosure.

FIG. 5 illustrates a vehicle visor system according to some embodiments of the present disclosure. As illustrated by the cross-section view of the vehicle visor, the vehicle visor substantially comprises a transparent display panel 504 and a shading plate 503.

The shading plate 503 is disposed on a side of the transparent display panel 504 facing towards outside of the vehicle and configured to cover or block an upper part of the transparent display panel 504 such that the upper part of the transparent display panel 504 and the shading plate 503 substantially form a non-transparent upper portion 101 (encircled with dotted line), and that the lower part of the transparent display panel 504 is uncovered to thereby substantially form a transparent lower portion 102 (encircled with dotted line).

In the vehicle visor as shown in FIG. 5, a length of the shading plate 503 can be adjusted, for example by electrochromic device (ECD) design, to control the length of the lower portion, and to further realize a control of the amount of incident light through the lower portion.

Figure 6:
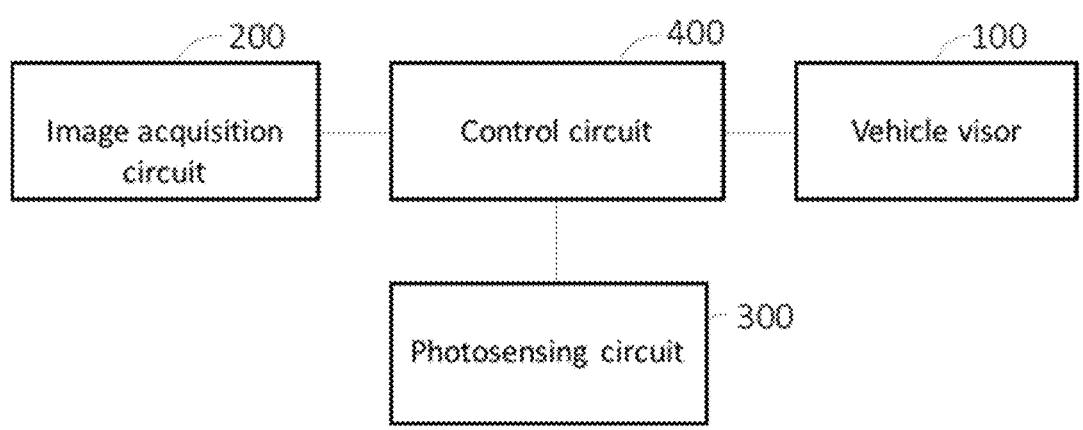
FIG. 6 is a schematic diagram of a vehicle visor system according to some embodiments of the present disclosure.

In a second aspect, the present disclosure provides a vehicle visor system. As shown in FIG. 6, the vehicle visor system comprises an image acquisition circuit 200, a photosensing circuit 300, a control circuit 400, and a vehicle visor 100 according to any of the embodiments as described above.

The image acquisition circuit 200 is coupled with the control circuit 400, and is configured to capture images of traffic in front of the vehicle;

The photosensing circuit 300 is coupled with the control circuit 400, and is configured to detect an incident light from outside of the vehicle;

The control circuit 400 is respectively coupled with the image acquisition circuit 200 and the upper portion of the vehicle visor 100, and is configured to control the image acquisition circuit 200 to capture the images of the traffic in front of the vehicle, to denoise the images to obtain processed images according to needs, and to transmit the processed images to the upper portion of the vehicle visor 100;

The control circuit 400 is further respectively coupled with the photosensing circuit 300 and the lower portion 102 of the vehicle visor 100, and is configured to adjust a rate of light transmission of the lower portion 102 of the vehicle visor 100 according to the incident light from outside of the vehicle.

The photosensing circuit 300 can be a photosensitive sensor; the image acquisition circuit 200 can be a high-definition wide-angle camera; and the control circuit 400 can be a CPU.

According to some embodiments of the present disclosure, at least one of the photosensing circuit 300, the image acquisition circuit 200, and the control circuit 400 can be integrated in the vehicle visor 100.

It is understandable that the photosensing circuit 300, each of the image acquisition circuit 200, and the control circuit 400 can be integrated in, or can be independent from (i.e. separated from), the vehicle visor 100.

According to some embodiments of the present disclosure, the vehicle visor system can further comprise a rotating shaft, configured to connect the vehicle visor with the vehicle. By means of the rotating shaft, the driver can expand or unexpand the vehicle visor.

According to some embodiments of the present disclosure, the vehicle visor system can further comprise a solar cell device, configured to provide a power supply to the vehicle visor system. The solar cell device can be disposed inside the rotating shaft to save space, but can also be disposed at other places (for example, on a side of the upper portion facing to the exterior of the vehicle, or integrated with the upper portion). There are no limitations herein.

According to some other embodiments of the present disclosure, the vehicle visor system can also be powered by a vehicle power supply, disposed in the vehicle, or by a power supply independently disposed.

In some embodiments of the vehicle visor system, the control circuit 400 can be further configured to process the images captured by the image acquisition circuit 200 to obtain extracted images of traffic blocked by the upper portion, and to transmit the extracted images of traffic to the upper portion for display.

Specifically in these embodiments of the vehicle visor system, when the driver starts the vehicle visor system, the image acquisition circuit 200 can capture the images of traffic in front of the vehicle (i.e. captured images), and the control circuit 400 can further process the captured images to extract images of traffic that are specifically blocked by the upper portion (i.e. extracted images). By displaying the extracted images (which are originally blocked by the upper portion of the vehicle visor) in the upper portion, the images displayed by the upper portion and the images through the lower portion can form a complete view of the images of the traffic in front of the vehicle. As such, the driver experience and the safety of driving can be improved.

In some embodiments of the vehicle visor system, the control circuit 400 can be further configured to detect whether preset noise exists in the images captured by the image acquisition circuit 200 (i.e. captured images) at a present interval, and if so, to denoise the captured images to obtain denoised images, and to then transmit the denoised images to the upper portion of the vehicle visor 100 for display. Herein the preset noise can include noise information associated with rain, snow, fog, or smug.

The denoising process as described above includes, but is not limited to, adjustment of parameters of color, sharpness, contrast, and brightness of images, and/or an optimization of algorithms by comparison with standard cloud data. Regardless of the manner of denoising, images will have an improved clarity after denoising, which can lead to an improved safety of driving.

Because of the influences by rain, snow, fog, and/or smug, the images captured by the image acquisition circuit 200 can contain noise, resulting in unclear images to adversely influence a judgement of the driver on the traffic. By means of the denoising processing performed by the control circuit, the captured images can be processed to result in clearer images.

According to some embodiments of the present disclosure, the vehicle visor system can further comprise a control button. The control button can be configured to receive a command (such as a pressing command) from the driver, and to trigger the control circuit to perform a denoising processing over the images captured by the image acquisition circuit to thereby obtain denoised images, which are then transmitted to, and displayed by, the upper portion of the vehicle visor. The control button can be integrated in, or can be separated from, the vehicle visor 100. There are no limitations herein.

Figure 7:
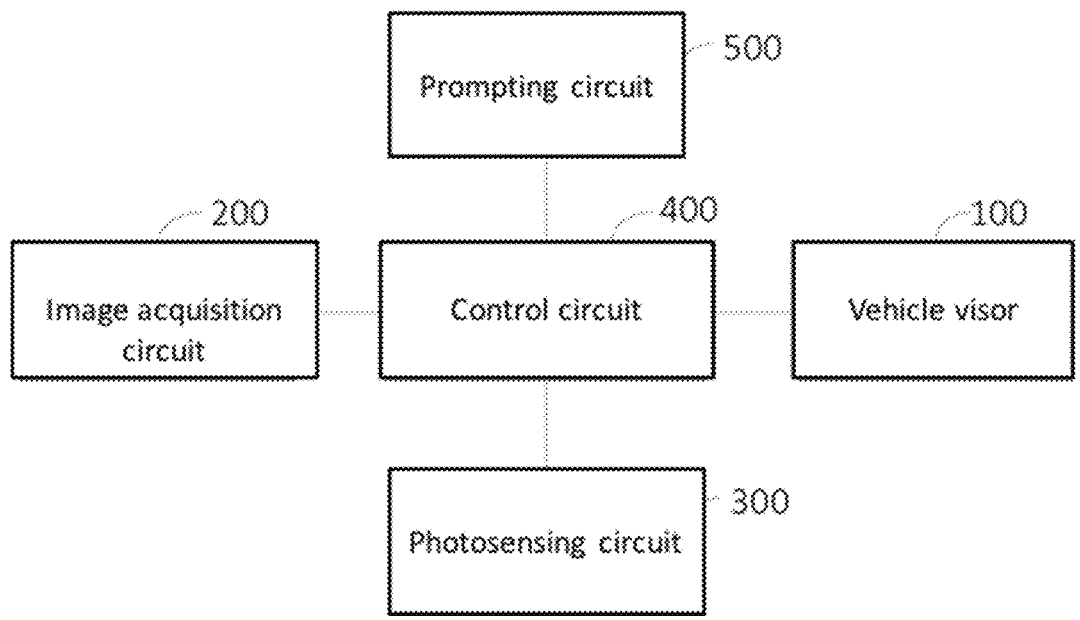
FIG. 7 is a schematic diagram of a vehicle visor system according to some other embodiments of the present disclosure.

According to some embodiments of the present disclosure, the vehicle visor system can further comprise a prompting circuit 500, as shown in FIG. 7. As such, the control button can be configured to determine an instant speed of the vehicle, and to send a prompt to the prompting circuit 500 if the instant speed is higher than a first preset speed. The prompting circuit 500 can then be configured to display the prompt. As such, if the vehicle is driving at a relatively high speed, the prompting circuit 500 can prompt the driver to reduce the driving speed.

In some embodiments of the vehicle visor system, the control circuit 400 can be further configured to determine a distance between the vehicle and an obstacle based on the images captured by the image acquisition circuit, and to send a prompt to the prompting circuit 500 if the distance is smaller than a preset threshold and the instant speed is higher than a second preset speed.

As such, if there is an obstacle in front of the vehicle and the vehicle is at a relatively high speed, the prompting circuit 500 can prompt the driver to pay attention to the road condition and to reduce the driving speed.

FIG. 8 illustrates a vehicle visor system according to some embodiments of the present disclosure. As shown in FIG. 8, the vehicle visor system is mounted onto a shelf 805, which in turn is attached to the vehicle. In addition to an upper portion 801 and a lower portion 802, which together form the vehicle visor 100 as shown in FIG. 6 and FIG. 7, the vehicle visor system further comprises a high-definition wide-angle camera 802, which serves as the image acquisition circuit 200 as shown in FIG. 6 and FIG. 7; a solar cell device 803, which is disposed as a component separated from the vehicle visor in the shelf 805; a photosensitive sensor 804, which serves as the photosensing circuit 300 as shown in FIG. 6 and FIG. 7.

In a third aspect, the present disclosure provides a light blocking and display method utilizing the vehicle visor according to any of the embodiments as described above.

Figures 9, 10:
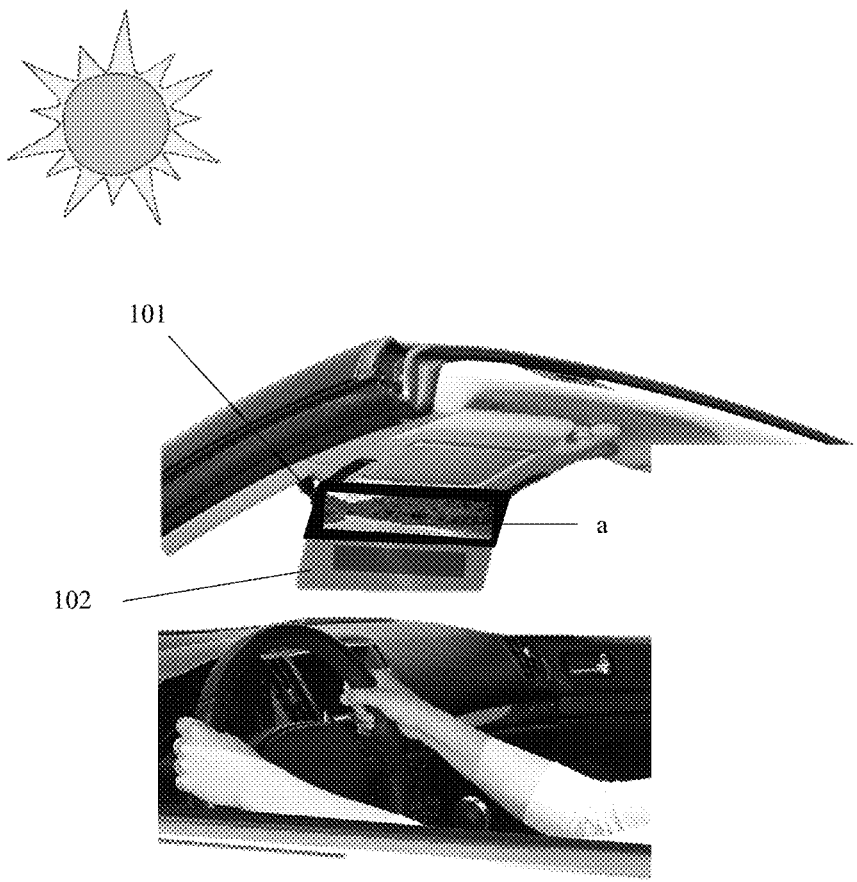
FIG. 9 is a flow chart of a light blocking and display method according to some embodiments of the present disclosure.
FIG. 10 shows an exemplary embodiment of a vehicle visor in a vehicle during operation.

As shown in FIG. 9, the method comprises:

S901: starting a vehicle visor such that a side of an upper portion of the vehicle visor facing to an interior of the vehicle displays images from an outside of the vehicle opposing to the vehicle visor, and that a lower portion of the vehicle visor adjusts a rate of light transmission thereof according to an incident light from the outside of the vehicle.

Because the aforementioned light blocking and display method utilizes the vehicle visor according to embodiments of the present disclosure as described above, thus by means of the light blocking and display method, in addition to meeting the basic requirement for blocking incident lights, the driver is also allowed to see the traffic in front of the vehicle in a real-time manner through the images displayed by the upper portion, and is allowed to further observe actual outside traffic through the lower portion to thereby avoid the danger associated with the delay in displaying the traffic images by the upper portion.

In a fourth aspect, the present disclosure provides a vehicle comprising the vehicle visor according to any of the embodiments as described above.

Herein the vehicle can be a car, a truck, a bus, or a vehicle of different types or purposes, such as a boat, an airplane, etc. Because of presence of the vehicle visor according to any of the embodiments as described above, the vehicle can have the benefits that are similar to those as described above.

FIG. 10 shows an exemplary vehicle comprising a vehicle visor as described above. Referring to FIG. 10, a driver is shown as sitting in the driver's seat of a convertible sedan. A vehicle visor 100 is shown here as being disposed at the position where conventional vehicle visors are normally positioned. Vehicle visor 100 has an upper portion 101 that is non-transparent and a second portion 102 that is transparent. The non-transparent portion 101 blocks bright light coming from the front of the vehicle (on the opposite side of the visor facing interior of the vehicle) so that the driver is not exposed to the bright light. Portion 102 of the visor can adjust a rate of light transmittance according to an incident light from the outside of the vehicle. In other words, 102 is a see-through panel that allows the driver to see through the visor at a reduced brightness. Portion 101 can display an image from the front of the vehicle so while it blocks light coming from the front of the vehicle, it can still provide view of the road in front via the display device a.

All references cited in the present disclosure are incorporated by reference in their entirety. Although specific embodiments have been described above in detail, the description is merely for purposes of illustration. It should be appreciated, therefore, that many aspects described above are not intended as required or essential elements unless explicitly stated otherwise.

Various modifications of, and equivalent acts corresponding to, the disclosed aspects of the exemplary embodiments, in addition to those described above, can be made by a person of ordinary skill in the art, having the benefit of the present disclosure, without departing from the spirit and scope of the disclosure defined in the following claims, the scope of which is to be accorded the broadest interpretation so as to encompass such modifications and equivalent structures.

The invention claimed is:

1. A vehicle visor configured to be installed in a vehicle for providing shading to a driver of the vehicle, comprising:
    a body in the shape of a rectangular flat panel having a front side that faces the driver and a back side that faces away from the driver; and
    a camera positioned on the back side of the vehicle visor, wherein, the vehicle visor comprises:
        an upper portion, comprising a display panel having a display screen facing the front side operatively connected to the camera configured to display images captured by the camera from behind the visor; and
        a lower portion, comprising a transparent display panel configured to be able to adjust a rate of light transmittance according to the light from behind the visor.

2. The vehicle visor of claim 1, wherein the display panel of the upper portion is non-transparent.

3. The vehicle visor of claim 1, wherein the display panel of the upper portion is transparent, and the upper portion further comprises a shading plate
    disposed on the back side of the visor, opposite from the display screen of the upper portion, said shading plate is configured to block light coming from outside of the vehicle.

4. The vehicle visor of claim 3, wherein the display panel of the lower portion and the display panel of the upper portion form an integrated display screen that is configured to be able to adjust a brightness according to the light from behind the visor.

5. The vehicle visor of claim 1, wherein the display panel of the lower portion is further configured to be a transparent display panel that is capable of displaying images from the back side of the visor captured by the camera.

6. The vehicle visor of claim 3, wherein the shading plate is configured to be a reflecting plate.

7. The vehicle visor of claim 1, wherein the lower portion is expandable or foldable.

8. The vehicle visor of claim 7, wherein the lower portion is expandable, and is configured to be able to adjust by an electrochromic device design.

* * * * *